United States Patent
Elad et al.

(10) Patent No.: US 10,805,403 B2
(45) Date of Patent: Oct. 13, 2020

(54) COMMUNICATION SERVER AND METHOD FOR SELECTIVE USE OF REAL TIME COMMUNICATION FEATURES

(71) Applicant: Genband US LLC, Plano, TX (US)

(72) Inventors: Asi Elad, Kiryat Onno (IL); Jean-Francois Morin, Audet (CA)

(73) Assignee: RIBBON COMMUNICATIONS OPERATING COMPANY, INC., Westford, MA (US)

(*) Notice: Subject to any disclaimer, the term of this patent is extended or adjusted under 35 U.S.C. 154(b) by 147 days.

(21) Appl. No.: 15/389,684

(22) Filed: Dec. 23, 2016

(65) Prior Publication Data
US 2017/0195391 A1    Jul. 6, 2017

Related U.S. Application Data

(60) Provisional application No. 62/273,866, filed on Dec. 31, 2015.

(51) Int. Cl.
*H04L 29/08* (2006.01)
*H04L 29/06* (2006.01)

(52) U.S. Cl.
CPC ........ *H04L 67/141* (2013.01); *H04L 65/1069* (2013.01); *H04L 65/1073* (2013.01); *H04L 67/02* (2013.01)

(58) Field of Classification Search
CPC ... H04L 41/046; H04L 67/1097; H04L 51/02; H04L 67/02; H04L 65/1073; H04L 65/1069; H04L 67/141; G06N 3/006
USPC ........................................................ 709/227
See application file for complete search history.

(56) References Cited

U.S. PATENT DOCUMENTS

| | | | | |
|---|---|---|---|---|
| 7,552,204 B2* | 6/2009 | Bobde | ..................... | H04L 29/06 709/202 |
| 8,649,768 B1* | 2/2014 | Gaddam | ............... | H04W 12/06 455/411 |
| 2007/0123223 A1* | 5/2007 | Letourneau | ....... | H04M 3/42161 455/414.1 |
| 2014/0064155 A1* | 3/2014 | Evans | ................ | H04L 65/1006 370/259 |
| 2015/0029296 A1* | 1/2015 | Ni | .......................... | H04N 7/148 348/14.01 |

(Continued)

*Primary Examiner* — Umar Cheema
*Assistant Examiner* — John Fan
(74) *Attorney, Agent, or Firm* — Haynes and Boone, LLP

(57) ABSTRACT

An apparatus and method for receiving a request from a first device requesting a communication session with a second device; coordinating with a communication gateway and a registration database to determine whether the second device is registered with the communication server; enabling transmission of a first notification to the second device in response to determining that the second device is registered with the communication server, or enabling transmission of a second notification to the second device in response to determining that the second device is not registered with the communication server, the first notification and the second notification notifying the second device of the request for the communication session; receiving an indication of acceptance of the communication session from the second device; and coordinating with the communication gateway to start the communication session between the first device and the second device in response to receiving the indication of acceptance.

16 Claims, 4 Drawing Sheets

(56) References Cited

U.S. PATENT DOCUMENTS

| | | | | |
|---|---|---|---|---|
| 2016/0142374 A1* | 5/2016 | Clark | ............... | H04L 63/0272 |
| | | | | 726/15 |
| 2016/0156484 A1* | 6/2016 | Matsuhara | .......... | H04L 12/4633 |
| | | | | 709/227 |
| 2017/0134212 A1* | 5/2017 | Sakakura | ............ | H04L 41/0246 |

\* cited by examiner

COMMUNICATION SERVER AND METHOD FOR SELECTIVE USE OF REAL TIME COMMUNICATION FEATURES

CROSS REFERENCE TO RELATED APPLICATION

The present description claims priority to the commonly owned U.S. Provisional Patent Application No. 62/273,866, titled COMMUNICATION SERVER AND METHOD FOR SELECTIVE USE OF REAL TIME COMMUNICATION FEATURES and filed Dec. 31, 2015, which is incorporated herein by reference in its entirety.

TECHNICAL FIELD

The present description relates, in general, to communication systems and, more specifically, to techniques for facilitating web-based real time communications by using a communication server including an orchestration layer.

BACKGROUND

WebRTC (Web Real Time Communication) is a project by the World Wide Web Consortium (3C) to define a set of Application Programming Interfaces (APIs) to enable browser-to-browser and browser-to-device applications for voice, video, and text. The introduction of WebRTC as a solution allows for the creation of new usage models for communication services. One new usage model includes the ability of a web user to simply initiate a real-time communication via a web application on the user's device (e.g., a personal computer, mobile device, etc.). In this model, the user can access an identifier (e.g., uniform resource identifier (URI)) pointing to a specific carrier communication ID (e.g., phone number, SIP user ID) through the web application to initiate the WebRTC communication session. However, currently there is no capability integrated within web applications to allow for the real-time WebRTC communication session to be conducted via the web applications itself.

In one example, a user utilizes a web application (e.g., browser) to visit a merchant's e-commerce website and contemplates making a purchase. There is a link on a webpage of the merchant's e-commerce website that indicates that the user can initiate a communication session with a merchant's representative in real time to ask questions or to place an order. When the user selects the link through the web application, a separate WebRTC client on the user's device is invoked to allow the user and the merchant's representative to conduct the communication session (e.g., voice, video, and text). The separate WebRTC client is invoked because web applications (e.g., browsers) are not designed to support real-time communication. That is, a web application does not include within itself the capability to enable real-time voice, video, and text communication. However, it is inconvenient for the user to switch between the web application and the separate WebRTC client during the real-time communication. Due to this inconvenience, the users may be unable to receive answers to their questions, and, as a result, the users may decide against making the purchase from the merchant's website.

It would be desirable for the users to use a web application that includes the capability of conducting the communication session via the web application itself instead of conducting the communication session through the separate WebRTC client. This would desirably allow for the communication session to be conducted within the context of the contemplated purchase by the users. Further, this would avoid the need for the users to switch between the web application and the separate WebRTC client during the real-time communication.

In addition to the above discussed communication session between a user and the merchant's representative, the user may wish to conduct a real-time communication session (e.g., voice, video, and text) with one or more persons on the user's contact list through the web application itself. The user may also wish to conduct a real-time communication session in which multiple users collaborate over audio and/or video and/or file-sharing communication session. It would be desirable for the user to manage these real-time communication sessions through a web application rather than using separate WebRTC clients.

In summary, it would be advantageous for the users to be able to conduct real-time communication sessions from within a given user application to optimize communications for various purposes including improved commerce.

BRIEF DESCRIPTION OF THE DRAWINGS

The present disclosure is best understood from the following detailed description when read with the accompanying figures.

SUMMARY

Figure 1:
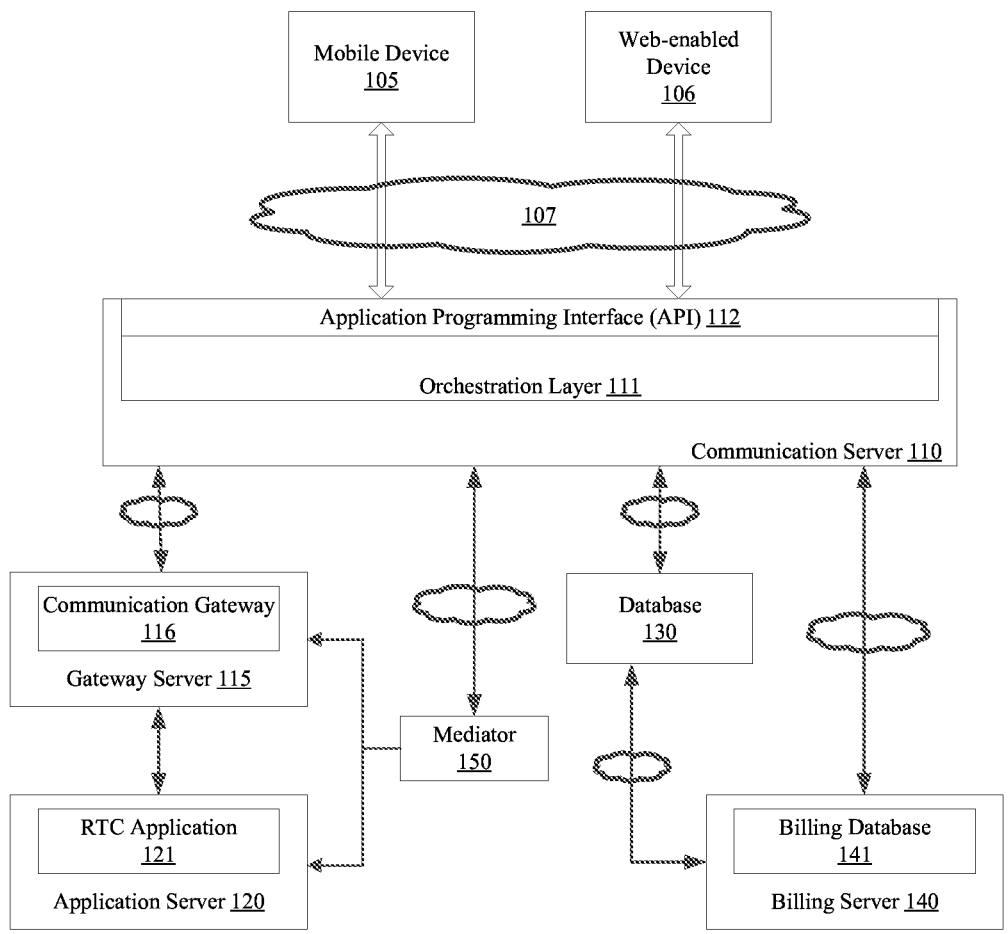
FIG. 1 illustrates an example network architecture in which exemplary embodiments may be incorporated.

According to one embodiment, a method is disclosed that includes receiving a request from a first device requesting a communication session with a second device; coordinating with a communication gateway and a registration database to determine whether the second device is registered with the communication server; enabling transmission of a first notification to the second device in response to determining that the second device is registered with the communication server, or enabling transmission of a second notification to the second device in response to determining that the second device is not registered with the communication server, the first notification and the second notification notifying the second device of the request for the communication session; receiving an indication of acceptance of the communication session from the second device; and coordinating with the communication gateway to start the communication session between the first device and the second device in response to receiving the indication of acceptance.

According to another embodiment, an apparatus including a registration database and the processor is disclosed. The processor may receive a request from a first device requesting a communication session with a second device; coordinate with a communication gateway and the registration database to determine whether the second device is registered with the apparatus; enable transmission of the first notification to the second device in response to determining that the second device is registered with the apparatus, or to enable transmission of a second notification to the second device in response to determining that the second device is not registered with the apparatus, the first notification and the second notification notifying the second device of the request for the communication session; receive an indication of acceptance of the communication session from the second device; and coordinate with the communication Gateway to start the communication session between the first device and the second device in response to receiving the indication of acceptance from the second device.

According to another embodiment, a method is disclosed in which a communication server enables communication between a first device operating over a first network and a second device operating over a second network. The method includes receiving, at a communication server, a request over the first network from the first device requesting a communication session with the second device; coordinating with the communication gateway and an applications server to transmit, over the second network, a notification to the second device, the notification notifying the second device of the request for the communication session; receiving, at the communication server, an indication of acceptance of the communication session from the second device; and in response to receiving the indication of acceptance, coordinating with the communication gateway and the applications server to enable the communication session between the first device and the second device over a combination of the first network and the second network.

According to another embodiment, a system is disclosed. The system includes a first device configured to communicate over a first network, a second device configured to communicate over a second network, and a communication server. The communication server receives a request from the first device requesting a communication session with the second device, the request being received over the first network, and enables transmission of a notification over the second network to the second device, the notification notifying the second device of the request for the communication session. Thereafter, the communication server receives an indication of acceptance of the communication session from the second device, and enables the communication session between the first device and the second device over a combination of the first network and the second network.

According to another embodiment, a computer readable storage medium is disclosed. The computer readable storage medium includes embedded therein instructions, which when executed by a processor, cause the processor to perform a method for enabling communication between a first device operating over a first network and a second device operating over a second network. The method includes receiving, at a communication server, a request over the first network from the first device requesting a communication session with the second device, the request including contact information associated with the first device and contact information associated with the second device; determining whether the first device is registered with the communication server; in response to determining that the first device is registered with the communication server, enabling transmission of a notification over the second network to the second device, the notification notifying the second device of the request for the communication session; receiving, at the communication server, an indication of acceptance of the communication session from the second device; and in response to receiving the indication of acceptance, enabling the communication session between the first device and the second device over a combination of the first network and the second network.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As discussed above, it would be advantageous to allow a user to conduct a real-time communication session from within a given application. To that end, the present disclosure proposes a communication server that includes an orchestration layer as a platform-as-a-service (PaaS). The embodiments described in more detail below allow for a web application to conduct real-time communication sessions via the web application itself through the orchestration layer of the communication server. In other words, the orchestration layer allows the web application to conduct real-time communication sessions (e.g., voice, video, and text) without the need to invoke a separate applications or clients. As such, the orchestration layer enables enrichment of applications and services with real-time contextual communications, providing a more engaging user experience and fostering collaboration. Other advantages of the orchestration layer include planned automation of tasks in a virtual computing environment (e.g., the cloud).

Generally, specific telecommunication functions are typically performed by separate and specialized pieces of hardware/servers. The presently proposed orchestration layer interacts with various virtualized telecommunication functions and interconnects these functions to provide real-time telecommunication services.

FIG. 1 illustrates a block diagram of the system architecture 100 in which the embodiments of the present disclosure may be incorporated. The system architecture 100 includes a user's mobile device 105 and a user's web-enabled device 106, both of interface with an orchestration layer 111 included in the communication server 110 using, for example, the Internet network 107. In various embodiments, the user devices 105, 106 interface with the orchestration layer 111 through a custom application programming interface (API) 112 included within the orchestration layer 111. In turn, the orchestration layer 111 interfaces with a communication gateway 116 included in a gateway server 115, a real-time communication (RTC) application 121 included in an application server 120, a system database 130, and a billing server 140 including a billing database 141. In various embodiments, the orchestration layer 111 may interface with the communication gateway 116 and the RTC application 121 through a mediator 150. Also, the orchestration layer 111 may interface with the billing server 140 directly or through the system database 130.

The communication server 110, the gateway server 115, the application server 120, and the system database 130 may be included within a single server or separate servers. Further, the various servers 110, 115, 120 of FIG. 1 are shown as single boxes for ease of illustration herein. However, the concept of a server in FIG. 1 may include more than one server, so for instance, the communication server 110 may represent a single server computer or multiple server computers working together. The same is true for the gateway sever 115, the application server 120, and the billing server 140—a single box can represent one or more servers. Various embodiments may include any appropriate hardware to act as a server, such as a general purpose computer running an operating system such as Linux. The user devices 105,106 may be any appropriate type of devices, such as laptop computers, desktop computers, smartphones, tablets, and the like. Although network 107 is shown as the Internet, it is understood that various embodiments may communicate across any appropriate network. For example, the user devices 105, 106 may interface with the orchestration layer 111 through a Local Area Network (LAN), Wide Area Network (WAN), cellular network, or any other network.

The orchestration layer 111 manages, monitors, and maintains various applications and services. The orchestration layer 111 includes the application programming interface (API) 112 to receive commands and messages from the user devices 105, 106, and relays the received commands and messages to the proper applications for processing. The orchestration layer 111 conveniently provides a unified interface to the users for using different services provided by the communication gateway 116, the RTC application 121, the database 130, and the billing server 140. As such, the orchestration layer 111 provides unified access to the applications and services of the communication gateway 116, the RTC application 121, the database 130, and the billing server 140 for the convenience of the user.

The present disclosure allows a user to interface with the orchestration layer 111 upon registration with the communication server 110. In various embodiments, a user may register with the communication server 110 by using a web portal to access the registration webpage of the communication server 110. The orchestration layer 111 enables storing of registration information of the user in a domain in the database 130. Registration information may also be stored in separate domains in the gateway server 115 and/or the application server 120. Registration information of the user may include information of the user such as name, telephone number, IP address, email, device information, billing account number, credit card number, and the like.

Upon registration, the user is provided with credentials to use when accessing the services provided by the communication gateway 116, the RTC application 121, the database 130, and the billing server 140. The user may access the above services via a given user application. In various embodiments the given user application may be provided by the provider of the communication server 110. The user application may be installed on the user's mobile device 105 and/or the user's web-enabled device 106 and/or be available through the user's website. The user application may be compatible with different mobile and web operating systems such as iOS, Android, Javascript, etc.

Is to be appreciated that the aforementioned merchant may register as a user of the communication server 110, and allow its clients or customers to conduct real-time communication sessions with merchant representatives. For instance, the merchant may provide a URL link on a user application being used by a client. The user application may describe that, by clicking on the URL link, the client may conduct a real-time communication session with a merchant representative at a call center. The client may click on the link and maybe able to access the services associated with the communication server 110 through the registered account of the merchant. In one embodiment, the client may click on the link and maybe able to conduct a real-time communication session with the merchant representative for the purpose of receiving customer service from the merchant. In this case, even though the client is the calling party and the merchant is the destination party, the communication server 110 bills or charges the account of the merchant who is the registered user. In other words, the merchant pays for the above communication session between the client and the merchant representative as part of providing customer service to its clients.

In the above scenario, it may be possible that the clients or customers conduct the real-time communication sessions by using external communication (voice/media) services that reside on an external network, while the merchant's representatives conduct the real-time communication sessions by using internal communication services that reside on internal network owned and operated by the merchant. In this case, by registering with the communication server 110, the merchant may allow the communication server 110 to interconnect the external communication services with the internal communication services to conduct the real-time communication session. That is, by registering with the communication server 110, the merchant may utilize a session initiation protocol (SIP) trunking service to set up the merchant's representatives as recipients of requests for real-time communication sessions. In other words, the merchant allows the communication server 110 to seamlessly route any requests for real-time communication sessions from the external network to the merchant's representatives on the internal network. This allows for an extremely cost effective way for the merchant to allow the merchants representatives to conduct real-time communication sessions with clients or customers operating on an external network.

The user application may include capability to carry out real-time communications from within the user application itself. For example, the user application includes the capability to carry out inbound and outbound voice-over-IP (VOIP) communication session and calling to the public switched telephone network (PSTN), maintain and use a central address book, instant messaging, file sharing, and video communication session. The user application may interface with the orchestration layer 111 through the application programming interface (API) 112 included within the orchestration layer 111. The credentials provided to the user may include, for example, a username and a password to be entered by the user to access the services provided by the system. The credentials may also include a number of credits purchased by the user to access the services. The credentials provided to a user may be associated with the user's registration information stored in the database 130.

Upon successful authentication, the orchestration layer 111 may coordinate with the communication gateway 116 to allow the authenticated user to access the applications and services integrated by the orchestration layer 111. For example, when the authenticated user wishes to conduct a communication session with a destination party, the user application on the user's mobile device 105 or the user's web-enabled device 106 provides the destination information (e.g., destination party's name, telephone number, IP address, etc.) to the orchestration layer 111.

The communication gateway 116 may allow the user access to a plurality of services. For example, the communication gateway 116 may authenticate the user as a registered user that has purchased a requisite number of credits to conduct the communication session. To authenticate the user, the communication gateway 116 may determine an identity of the user based on (i) a telephone number when the user uses the mobile device 105 to access the communication server 110, or (ii) an IP address when the user uses the web-enabled device 106 to access the communication server 110. In various embodiments, the communication gateway 116 may coordinate with the orchestration layer 111 and the database 130 to compare the determined telephone number/

IP address with the registration information of the users stored in the database 130. The communication gateway 116 may authenticate the user as a registered user with sufficient credits to conduct the communication session upon finding a match for the determined telephone number/IP address, etc. in the database 130. Of course, the communication gateway 116 may use any information other than the telephone number/IP address for authentication purposes. Upon successful authentication, the orchestration layer 111 coordinates with the communication gateway 116, the RTC application 121, the database 130, and the billing server 140 to allow the authenticated user to conduct the communication session.

In various embodiments, as shown in FIG. 1, the orchestration layer 111 may interface with the mobile device 105 or the web-enabled device 106 through the application programming interface 112. That is, the mobile/web-enabled device 105,106 may call functions of the application programming interface 112 to inform the orchestration layer 111 that the user wishes to conduct a communication session with a destination party. In various embodiments, the user application on the mobile/web-enabled device 105,106 may allow the user to identify the destination party, and to issue an HTTP/HTTPS request to communicate with the destination party. The application program interface 112 may receive the HTTP/HTTPS request from the mobile/web-enabled device 105,106 via the network 107 (e.g., Internet). The application program interface 112 may be configured to accept the HTTP/HTTPS request in several different formats, such as XML, JSON, and URL-Encoded (GET/POST).

The communication gateway 116 receives this destination information from the orchestration layer 111, and determines whether the destination party is another registered user of the communication server 110. In various embodiments, the communication gateway 116 may determine whether the destination party is another registered user by matching the received destination information with the registration information of the users stored in the database 130.

When it is determined that the destination party is another registered user of the communication server 110, the communication gateway 116, the RTC application 121, and the orchestration layer 111 may coordinate to set up the communication session and send or push a notification to the mobile device or the web-enabled device of the destination party. For example, the communication gateway 116 or the orchestration layer 111 may coordinate with the RTC application 121 to set up the communication session. Further, the orchestration layer 111 may send or push a notification to the mobile device or the web-enabled device of the destination party. The pushed notification from the orchestration layer 111 may inform the destination party that the authenticated user wishes to conduct a web communication session with the destination party. If the destination party accepts the communication session via the mobile/web-enabled device, then the orchestration layer 111 may provide the necessary signaling (e.g., SIP) for the RTC application to set up the communication session. In this way, the communication gateway 116, the orchestration layer 111, and the RTC application 121 may coordinate with each other to conduct a web communication session (audio and/or video) between the authenticated user's mobile/web-enabled device 105, 106 and the destination party.

The orchestration layer 111 may further coordinate with the billing server 140 to determine and bill the charges incurred for the web communication sessions to the authenticated user's account. In various embodiments, the orchestration layer 111 may enable the monitoring of duration of the communication session, and coordinate with the billing server 140 to bill/charge the authenticated user for the communication session. The coordination with the billing server 140 may include deducting a number of credits required for the above communication session from the number of credits previously purchased by the authenticated user.

The communication gateway 116 may also allow the authenticated user to conduct communication sessions with the destination party over a plurality of different networks. For example, when it is determined that the destination party is not another registered user of the communication server 110, the communication gateway 116 may coordinate with the orchestration layer 111 and the RTC application 121 to set up a public switched telephone network (PSTN) phone call to the destination party. That is, the communication gateway 116 may coordinate to set up an IP to PSTN call between the authenticated user and the destination party. This IP to PSTN call may include a portion of the call being conducted over the Internet protocol and another portion over the PSTN network.

In various embodiments, the communication gateway 116 may request the RTC application 121 to set up the IP to PSTN call by providing the RTC application 121 with registration information (e.g., IP address) of the authenticated user and destination information (e.g., telephone number) of the destination party. The RTC application 121 may use address translation to translate the IP address of the authenticated user into a telephone number. The RTC application 121 may then use the translated telephone number to place the call the destination party over the PSTN network. For example, to place the call, the RTC application 121 may provide the translated telephone number of the authenticated user and the telephone number of the destination party to a PSTN provider. Upon acceptance of the call by the destination party, the IP to PSTN call is set up and the authenticated user and the destination party may communicate.

During the communication, data may be received by the orchestration layer 111 in the form of digital IP packets from the authenticated user over the IP network. In this case, the RTC application 121 may receive and process the digital IP packets into a digital signal, and then convert the digital signal into an analog signal to be sent to the PSTN provider for communication over the PSTN network. Also, data may be received by the RTC application 121 (through the PSTN provider) in the form of an analog voice signal from the destination party over the PSTN network. In this case, the RTC application 121 may convert the analog voice signal into a digital voice signal, and then use a codec to process the distal voice signal to produce digital IP packets to be sent to the authenticated user over the IP network.

In this way, the orchestration layer 111, the communication gateway 116, and the RTC application 121 may coordinate the processing and the signaling required to conduct the above IP to PSTN call. As such, the orchestration layer 111, the communication gateway 116, and the RTC application 121 together act as a bridge between the device of the authenticated user that is using the Internet protocol to call the telephone number of the destination party over the PSTN network. The orchestration layer 111 may further coordinate with the billing server 140 to determine and bill the charges incurred for the IP to PSTN call to the authenticated user's account. To conduct the above communication sessions, the components 111, 116, 121 may use one or more signaling protocols, such as SIP or other protocol. Once the communication session has been set up, audio and video communication may be enabled as discussed above by using, for example, Real-time Transport Protocol (RTP) or other protocol. File sharing may be performed using, for example, File Transport Protocol (FTP) or other protocol.

The application server 120 simplifies and enriches the user experience by providing real-time multimedia applications for communication such as the RTC application 121. With the help of the RTC application 121, information may be exchanged instantly or with negligible latency. During communication enabled by the RTC application 121, the data is communicated between the source and the destination in real time. The RTC application may integrate voice, video, instant messaging, presence, mobility, conferencing and collaboration over any network and any device, including: mobile and tablet devices, WebRTC-based web clients, PCs, Macs, smartphones, ATAs/MTAs/ONTs and TVs.

The communication gateway 116 and the RTC application 121 may communicate with other components of the system by using their respective protocols and interfaces. For instance, the communication gateway 116 may use a Symbol Object Access Protocol (SOAP) based protocol such as Web Services Management (WSMAN), and the RTC application 121 may use the Subscriber Open Programmability Interface (SOPI). In this case, the orchestration layer 111 may communicate with the communication gateway 115 and the RTC application 121 through a mediator 150. The orchestration layer 111 may provide the mediator 150 with the information, which may be appropriately converted by the mediator 150 for communication with the communication gateway 115 or the RTC application 121, and vice versa.

The billing server 140 may provide billing solutions for the applications and services used by authenticated users. The orchestration layer 111 may monitor the activities of the authenticated users, and may coordinate with the billing server 140 to charge the authenticated users for their activities.

Figure 2:
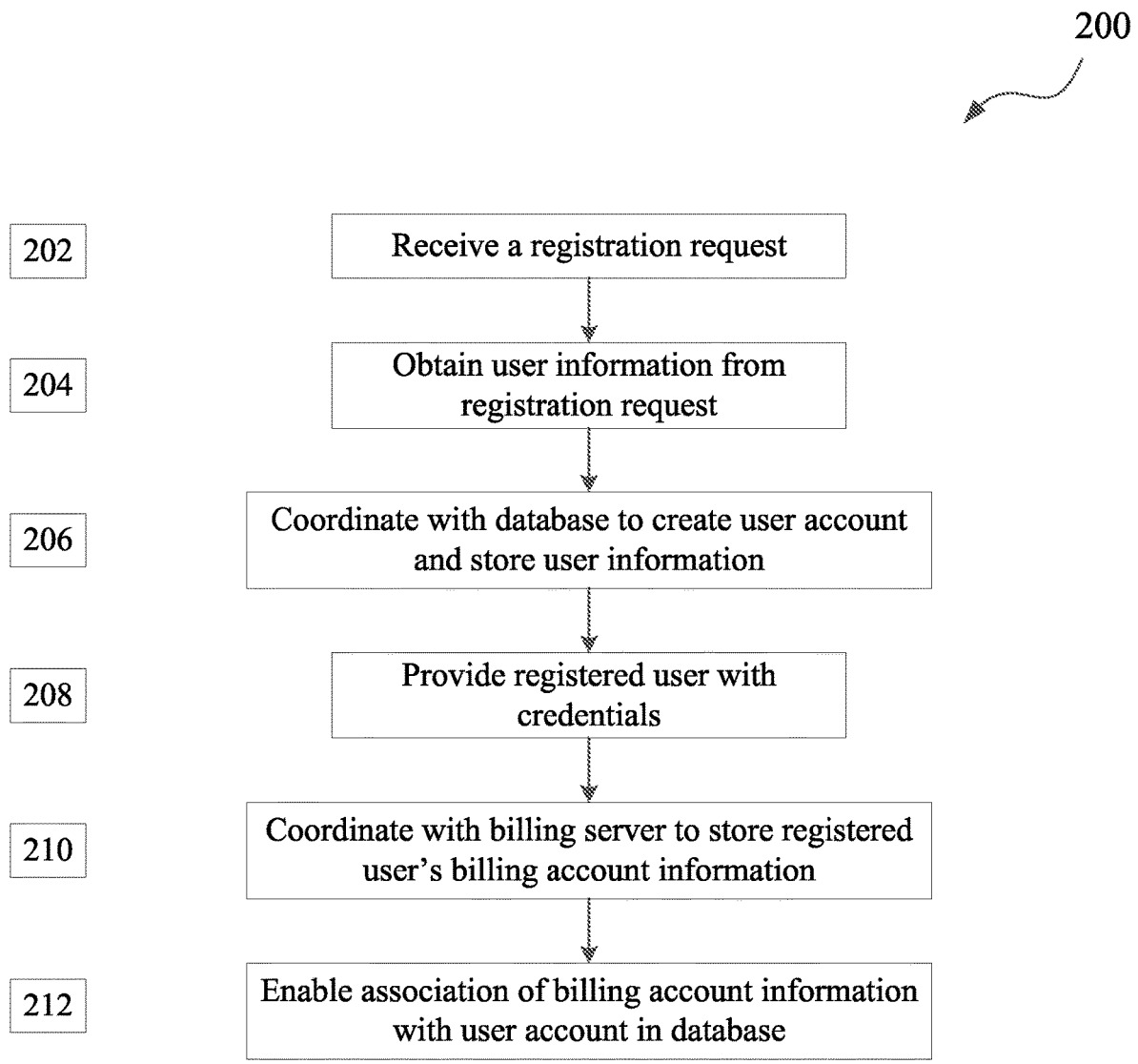
FIG. 2 is a flowchart illustrating a method 200 for registering a user of the communication server.

FIG. 2 is a flowchart illustrating a method 200 for registering a user of the communication server 110. At step 202, the orchestration layer 111 of the communication server 110 may receive an HTTP registration request over the network 107. The registration request may be sent by a user that wishes to set up an account to access the applications and services integrated by the communication server 110. The orchestration layer 111 may receive the registration request from the user's mobile/web-enabled device 105, 106 through the custom application program interface 112. The registration request may include user information such as name, telephone number, IP address, email, device information, billing account number and/or credit card number, and the like.

In response to receiving the registration request, the orchestration layer 111 performs steps 204-208. At step 204, the orchestration layer 111 processes the registration request to obtain the user information.

At step 206, the orchestration layer 111 coordinates with the database 130 to create an account for the requesting user, and to store and associate the obtained user information in the account created for the requesting user.

At step 208, upon creation of the account and the storing of the obtained user information, the orchestration layer 111 provides the user with credentials including a username and password, which may be used by the user to access the applications and services integrated by the communication server 110.

At step 210, the orchestration layer 111 coordinates with the billing server 140 to store the user's billing account information including a billing account number and/or credit card number, and the like in the billing database 141.

At step 212, the orchestration layer 111 enables the association of the billing account information of the user in the billing database 141 with the user account in the database 130. This allows the orchestration layer 111 to appropriately bill the billing account of the user for any services utilized by the user.

In this way, the orchestration layer 111 allows a user to become a registered user of the communication server 110.

Figure 3:
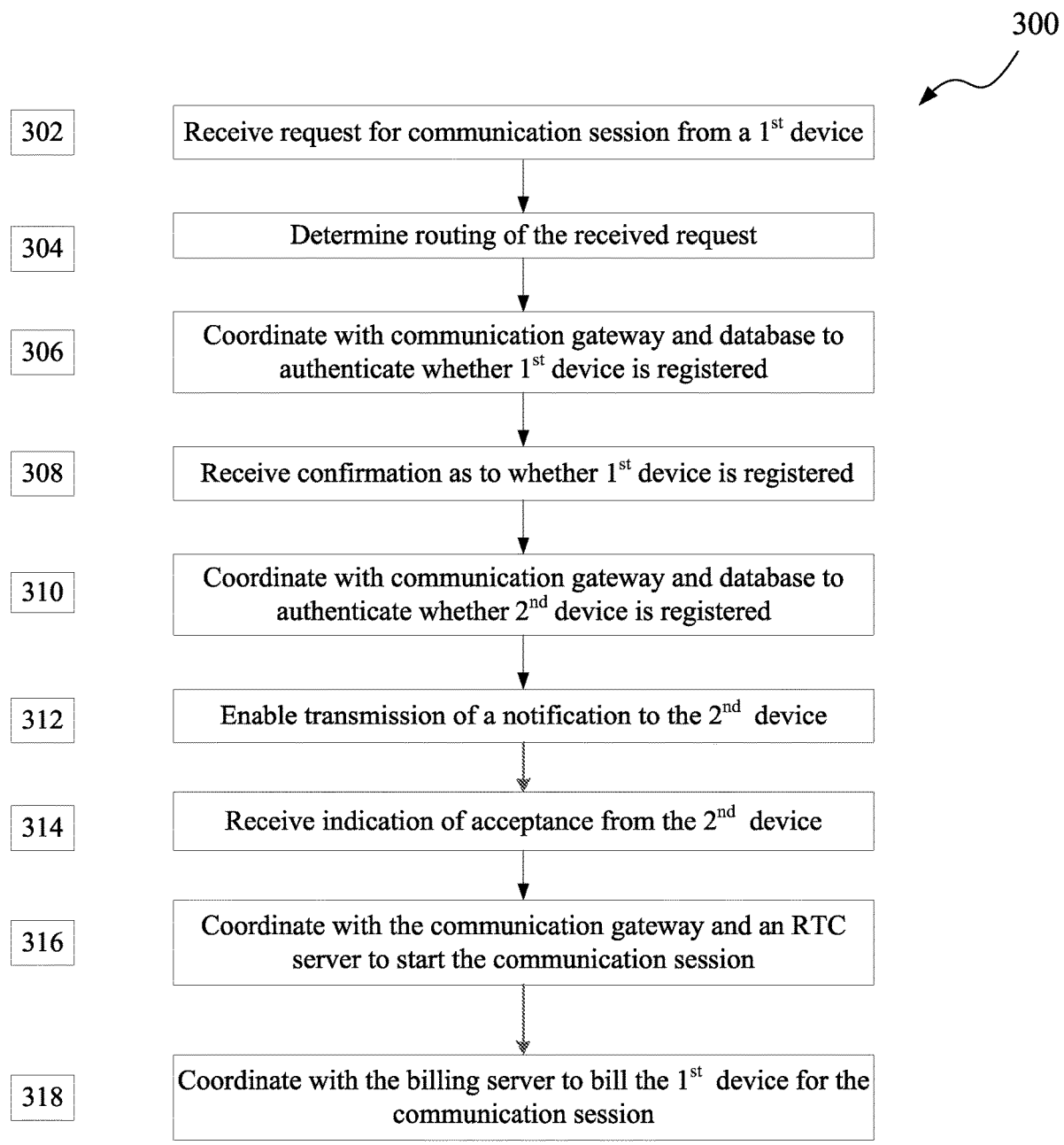
FIG. 3 is a flowchart illustrating a method 300 for a registered user accessing services through the communication server.

FIG. 3 is a flowchart illustrating a method 300 for a registered user accessing services integrated by the communication server 110. In various embodiments, a registered user wishes to conduct the communication session with a destination party. The communication session may be a voice communication, video communication, text communication, data/file-sharing communication, etc.

At step 302, the orchestration layer 111 receives an HTTP request for a communication session from a caller's mobile/web-enabled device 105, 106 over network 107. The caller may click on a web uniform resource locator (URL) available to the user application to send the communication session request to the orchestration layer 111. Further, the communication session request may include destination information regarding a destination party with whom the caller wishes to set up the communication session. The destination information may include contact information such as the destination party's name, phone number, IP address, etc.

At step 304, the orchestration layer 111 may determine whether the communication gateway 116 is using a respective protocol (e.g., WSMAN) for communication. The orchestration layer 111 may route the received communication session request to the communication gateway 116 via an HTTP message when the orchestration layer 111 determines that the communication gateway 116 is not using a respective protocol for communication. On the other hand, the orchestration layer 111 may route the received communication session request via an HTTP message to the mediator 150 when the orchestration layer determines that the communication gateway 116 is using a respective protocol for communication. The mediator 150 may convert the HTTP message from the orchestration layer 111 into the respective protocol (e.g., WSMAN) to route the communication session request to the communication gateway 116.

At step 306, the orchestration layer 111 may coordinate with the database 130 to enable the communication gateway 116 to authenticate the caller as a registered user of the communication server 110. In various embodiments, the orchestration layer 111 may coordinate with the database 130 to enable the communication gateway 116 to authenticate the mobile/web-enabled device 105, 106 as devices of a registered user of the communication server 110. The orchestration layer 111 may use the caller's information (e.g., name, phone number, etc.) to query the database 130 to provide any registered user information corresponding to the caller's information. The orchestration layer 111 may pass any registered user information received from the database 130 to the communication gateway 116. As discussed previously, the orchestration layer 111 may communicate with the communication gateway 116 directly or through the mediator 150.

At step 308, the orchestration layer 111 may receive confirmation from the communication gateway 116 as to whether the caller is a registered user of the communication server 110. If the caller is not a registered user of the communication server 110, then the orchestration layer 111 sends an HTTP message to the caller's mobile/web-enabled device 105, 106 denying the caller's request to communicate with the destination party. This HTTP message may include information enabling the caller to become a registered user of the communication server 110. If the caller is a registered user of the communication server 110, then the method moves to step 310.

At step 310, the orchestration layer 111 may coordinate with the communication gateway 116 to determine whether the destination party is a registered user of the communication server 110. The process to determine whether the destination party is a registered user of the communication server 110 may be similar to the process to determine whether the caller is a registered user of the communication server 110. In various embodiments, the orchestration layer 111 may use the destination information (e.g., name, phone number, etc.) provided by the caller to query the database 130 to provide any registered user information associated with the destination information. The orchestration layer 111 may then pass any information returned by the database 130 to the communication gateway 116.

At step 312, the orchestration layer 111 may enable transmission of a notification to the destination party based on whether the destination party is a registered user of the communication server 110. For example, when it is determined that the destination party is a registered user of the communication server 110, the orchestration layer 111 may send or push a notification to the mobile/web-enabled device 105, 106 of the destination party. The notification informs the destination party that the caller wishes to conduct a communication session with the destination party. The notification may also identify the caller and the type of communication session (e.g., voice communication, video communication, text communication, data/file-sharing communication, etc.) desired. The notification may display links or buttons on the destination party's mobile/web-enabled device 105, 106 to allow the destination party the option of accepting or declining the communication session.

On the other hand, when it is determined that the destination party is not a registered user of the communication server 110, the orchestration layer 111 may determine whether the destination information includes a PSTN telephone number of the destination party. If so, the orchestration layer 111 may coordinate with the communication gateway 116 and the RTC application 121 to conduct an IP to PSTN communication session between the caller and the destination party. The orchestration layer 111 may communicate with the RTC application 121 through the communication gateway 116 or through the mediator 150. The orchestration layer 111 may pass the destination information to the RTC application 121 to conduct the IP to PSTN communication session between the caller and the destination party. Under the direction of the orchestration layer 111 and/or the communication gateway 116, the RTC application 121 may communicate with a Session Border Controller (SBC) to initiate the PSTN communication session to the destination party. A notification (e.g., telephone ring) is provided to a device of the destination party and the destination party has the option of accepting the communication session by picking up a receiver of the device. In various embodiments, the above notifications are provided to the device of the destination party only when it is determined, in step 308, that the caller is a registered user of the communication server 110.

At step 314, the orchestration layer 111 receives an indication from the destination party as to whether the destination party has accepted or declined the caller's communication session (e.g., web call of step 308 or the IP to PSTN call of step 310). If the destination party has declined the caller's communication session, then the orchestration layer 111 may pass an HTTP message to the mobile/web-enabled device 105, 106 of the caller to inform the caller of the destination party's declination of the caller's communication session. On the other hand, if the destination party has accepted the caller's communication session, then the orchestration layer 111 may enable the processing and signaling required for the communication session (e.g., web call or IP to PSTN call) to be started between the caller and the destination party.

At step 316, the orchestration layer 111 may coordinate with the RTC application 121 to start the web communication session or the IP to PSTN communication session between the caller and the destination party. In various embodiments, the orchestration layer 111 may conduct the signaling required to establish live connectivity between the caller's mobile/web-enabled device 105, 106 and the communication gateway 116. Under the direction of the orchestration layer 111, the communication gateway 116 may coordinate with the RTC application 121 to start the web communication session or the IP to PSTN communication session between the caller and the destination party. In this way, the orchestration layer, the communication gateway 116, and the RTC application 121 allow a caller to start a communication session with the destination party. Further, the communication session may be an IP to PSTN communication session which may be conducted over a combination of the IP network and the PSTN network.

Upon starting of the communication session between the caller and the destination party, at step 318, the orchestration layer 111 may coordinate with the billing server 140 to bill/charge the caller for the above communication session with the destination party. In various embodiments, the orchestration layer 111 may enable the monitoring of duration of the communication session between the first device and the second device, and coordinate with the billing server 140 to bill/charge the caller for the communication session. The coordination with the billing server 140 may include deducting a number of credits required for the above communication session from the number of credits previously purchased by the caller. Other ways of billing/charging the caller for the above communication session are also possible.

As discussed previously, a merchant may register as a user of the communication server 110, and allow its clients or customers to conduct real-time communication sessions with merchant representatives. For instance, the merchant may provide a URL link on a user application being used by a client. The user application may describe that, by clicking on the URL link, the client may conduct a real-time communication session with a merchant representative at a call center. The client may click on the link and maybe able to access the services associated with the communication server 110 through the registered account of the merchant. In one embodiment, the client may click on the link and maybe able to request a real-time communication session with the merchant representative for the purpose of receiving customer service from the merchant. The client's request may be received by the communication server 110 with, for example, the merchant representative's PSTN phone number (step 302). In response to receiving the client's request, the communication server 110 may coordinate with the communication gateway 116 and database 130 to determine whether the client's device and the merchant representative's device are accessing the services associated with the communication server 110 through a properly registered account (steps 306-310). Once determined, the communication server 110 enables transmission of a notification of the requested communication session to the merchant representative's device, and may receive an indication of acceptance of the requested communication from the merchant representative's device (steps 312-314). Upon receiving the acceptance from the merchant representative's device, the communication server 110 may coordinate with the communication gateway 116 and the RTC server 122 conduct the communication session between the client and the merchant representative (step 316). In this case, even though the client is the calling party and the merchant is the destination party, the communication server 110 bills or charges the account of the merchant who is the registered user (step 318). In other words, the merchant pays for the above communication session between the client and the merchant representative as part of providing customer service to its clients.

Figure 4:
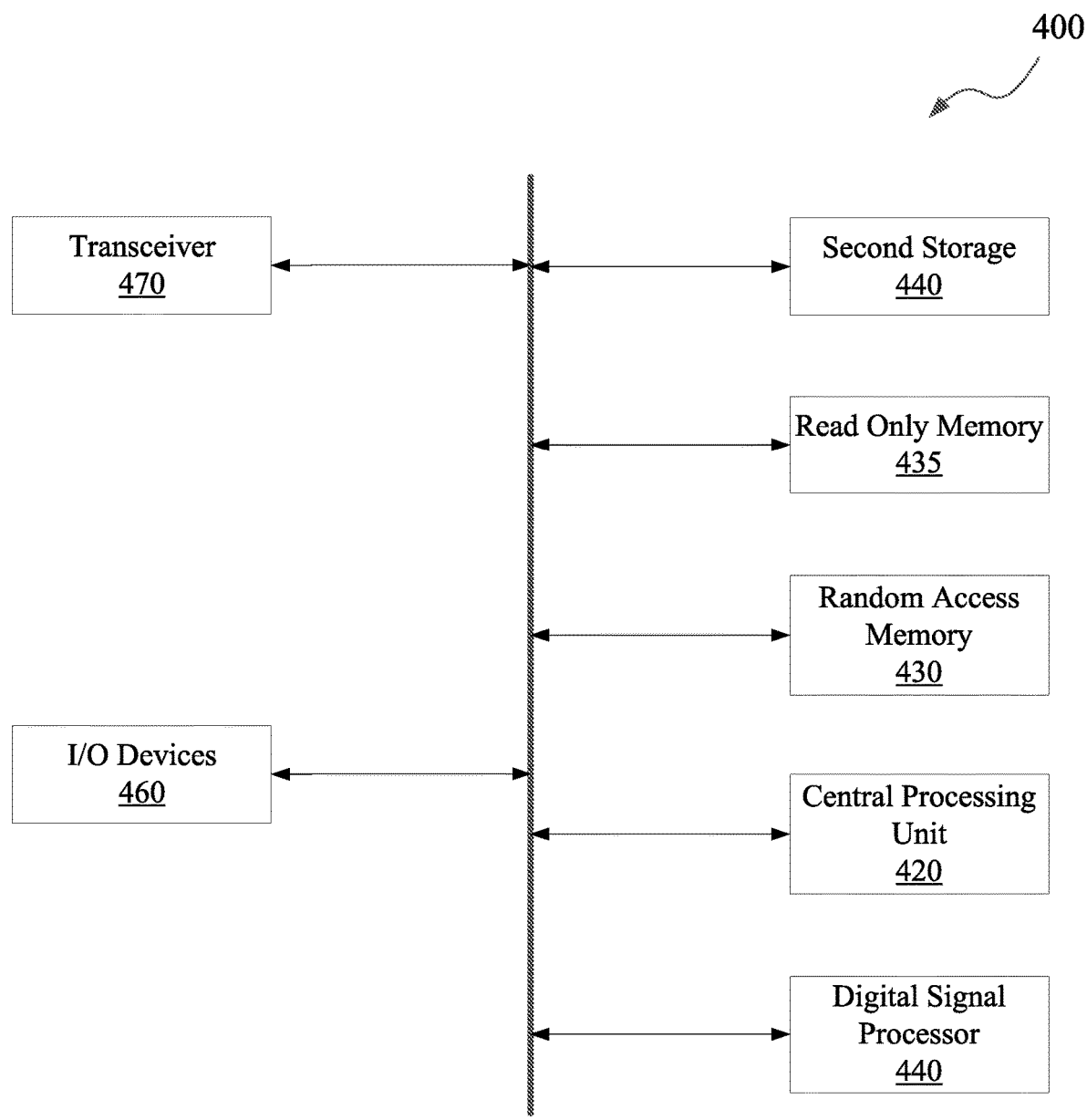
FIG. 4 illustrates an example computer system 400 adapted according to one embodiment of the present disclosure.

FIG. 4 illustrates an example computer system 400 adapted according to one embodiment of the present disclosure. The computer system 400 includes an example system on which embodiments of the present disclosure may be implemented (such as servers 110, 115, 120, 140). The computer system 400 includes a digital signal processor (DSP) 410, a central processing unit (CPU) 420, a random access memory (RAM) 430, a read-only memory (ROM) 435, secondary storage 440, encryption and decryption resources 450, input/output (I/O) devices 460, and a of transceivers 470, all of which may be communicatively coupled via a bus 402.

The CPU 420 may be implemented using hardware or a combination of hardware and software. Although illustrated as a single CPU, the CPU 420 is not so limited and may comprise multiple processors. The CPU 420 may be implemented as one or more processors, i.e., as one or more chips, cores (e.g., a multi-core processor), field-programmable gate arrays (FPGAs), and/or application specific integrated circuits (ASICs). Likewise, the DSP 410 may be implemented as more than one DSP chip. The DSP 410 may perform transcoding or transrating of a media stream or call flow received by a transceiver 470. Crypto resources (not shown) may include a hardware accelerator for performing security features such as encryption or authentication of a media stream or call flow received by transceiver 470.

The secondary storage 440 may comprise one or more disk drives or solid state drives and is used for non-volatile storage of data and as an over-flow data storage device if the RAM 430 is not large enough to hold all working data. The RAM 430 may be static RAM, dynamic RAM, or the like, and the ROM 435 may be programmable ROM (PROM), erasable PROM (EPROM), electrically EPROM (EEPROM), or the like. The secondary storage 440 may be used to store programs that are loaded into the RAM 430 when such programs are selected for execution. The ROM 435 is used to store instructions and perhaps data that are read during program execution. The ROM 435 is a non-volatile memory device that typically has a small memory capacity relative to the larger memory capacity of the secondary storage. The RAM 430 is used to store volatile data and perhaps to store instructions. Access to both the ROM 435 and the RAM 430 is typically faster than to the secondary storage 440.

The computer system 400 includes transceivers 470. There may be a transceiver 470 for each communication line (e.g., electrical or optical) coupled to the computer system 470. A transceiver 470 may be bidirectional or unidirectional, depending on the embodiment. Each transceiver 470 is adapted to couple computer system 400 to a communication link (e.g., a wired or wireless communication link). In the examples of FIGS. 1 and 2, transceivers 470 may couple a respective device to network 120 and/or to network 170.

The I/O devices 460 may include a keyboard, a computer mouse, a microphone, and/or a display device for allowing a user to provide input to and receive output from the computer system 400.

It is understood that by programming and/or loading executable instructions onto the computer system 400, at least one of the CPU 420, the RAM 430, and/or the secondary storage 440 are changed, transforming the computer system 400 in part into a particular machine or apparatus having the functionality taught by the present disclosure. The executable instructions may be stored on the RAM 430 or secondary storage 440 and loaded into the CPU 420 for execution. The device functionality described above with respect to FIGS. 1-3 may be implemented as a software application running on the CPU 420 and using the RAM 430, the ROM 435, and/or secondary storage 440. Specifically, for server 130, its functions described at FIGS. 2 and 3 may be implemented as a software application running on the CPU 420.

Logic may be encoded in a non-transitory computer-readable medium, such as RAM 430 and/or secondary storage 440. Such a medium can take many forms, including but not limited to, non-volatile media and volatile media. In various implementations, non-volatile media includes optical or magnetic disks, such as secondary storage 440, and volatile media includes dynamic memory, such as various types of RAM 430. CPU 420 reads application code from the readable medium and executes the code to provide the described functionality.

It should be noted that the disclosure is not limited to the specific embodiments shown above. For instance, other embodiments may include a communication session of any type, such as messaging, voice, video, file sharing, and the like.

The scope of embodiments is not limited to any particular type of communication. For instance, various embodiments may be applied to voice communication, instant messaging, multimedia video conferences, file sharing, and the like. Further, while the examples below focus on a Session Initiation Protocol (SIP) embodiment, any appropriate communication protocol can be used in various embodiments. Moreover, the examples below assume use of WebRTC as the communication protocol; however, the scope of embodiments can be applied to any communication protocol that allows a user on one network to conduct real-time communications with a user on a different network. For example, a browser or web-enabled application can be extended via media handling plugins, get access to media input/output on the device running the browser and transport it over any type of bearer, as long as the other end of the communication session has a compatible implementation.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   receiving, at a communication server, a request from a first device requesting a communication session with a second device, the first device being a web-enabled device;
   in response to receiving the request, coordinating with a communication gateway and a registration database to determine whether the second device is registered with the communication server;
   in response to determining that the second device is not registered with the communication server, determining whether a destination address of the second device is for a Public Switched Telephone Network (PSTN);
   in response to determining that the destination address of the second device is for a PSTN, coordinating with the communication gateway to conduct an Internet Protocol (IP) to PSTN communication session between the first device and the second device;
   enabling transmission of a notification to the second device, the notification notifying the second device of the request for the communication session, including enabling transmission of the notification to the second device via the PSTN;
   receiving, at the communication server, an indication of acceptance of the communication session from the second device; and
   coordinating with the communication gateway to start the communication session between the first device and the second device in response to receiving the indication of acceptance from the second device.

2. The method of claim 1, further comprising:
   coordinating with a billing server to bill the first device in accordance with a duration of the communication session between the first device and the second device.

3. The method of claim 1, wherein the receiving the request comprises receiving a hypertext transfer protocol (HTTP) message including contact information associated with the first device and contact information associated with the second device.

4. The method of claim 3, wherein the coordinating with the communication gateway and the registration database comprises:
   querying the registration database for information corresponding to the contact information associated with the second device, and
   providing, to the communication gateway, information returned by the registration database in response to the querying.

5. The method of claim 3, further comprising:
   coordinating with the communication gateway and the registration database to determine whether the first device is registered with the communication server, the coordinating including,
   querying the registration database for information corresponding to the contact information associated with the first device, and
   providing, to the communication gateway, information returned by the registration database in response to the querying.

6. The method of claim 5, wherein the enabling transmission of the notification includes enabling transmission of the notification only upon determining that the first device is registered with the communication server.

7. The method of claim 1, wherein enabling transmission of the notification includes enabling transmission of an HTTP notification message to the second device via the Internet.

8. The method of claim 1, further comprising:
   coordinating with a real-time communication (RTC) server to allow the Internet protocol (IP) to PSTN communication session between the first device and the second device.

9. An apparatus, comprising:
   a communication server for a web Real Time Communication (RTC) service in communication with a first device operating over a first network and a second device operating over a second network, the first device being a web-enabled device, the communication server configured to:
   receive a request from the first device requesting a communication session with the second device, the request being received over the first network;
   in response to receiving the request, determine that the second device is not registered with the communication server;
   in response to determining that a destination address of the second device is for a Public Switched Telephone Network (PSTN), coordinate with a communication gateway to conduct an Internet Protocol (IP) to PSTN communication session between the first device and the second device;
   notify the second device of the request for the communication session;
   receive an indication of acceptance of the communication session from the second device; and
   coordinate with the communication gateway to start the communication session between the first device and the second device over a combination of the first network and the second network, wherein the communication server is configured to enable the communication session between the first device and the second device over a combination of a web-based network and the PSTN.

10. The apparatus of claim 9, wherein the communication server is configured to communicate with a billing server to bill the first device in accordance with a duration of the communication session between the first device and the second device.

11. The apparatus of claim 9, wherein the request includes a hypertext transfer protocol (HTTP) message including contact information of the first device and contact information of the second device.

12. The apparatus of claim 11, wherein the communication server is configured to:
   query a registration database for information corresponding to the contact information associated with the second device, and
   provide, to the communication gateway, information returned by the registration database in response to the query.

13. The apparatus of claim 11, wherein the communication server is configured to:
   query a registration database for information corresponding to the contact information associated with the first device, and
   provide, to the communication gateway, information returned by the registration database in response to the query to determine whether the first device is registered with the communication server.

14. The apparatus of claim 13, wherein the communication server is configured to communicate an instruction to the communication gateway only upon determining that the first device is registered with the apparatus.

15. The apparatus of claim 9, wherein the first network is the web-based network and the second network is the public switched telephone network (PSTN).

16. A computing system comprising a processor and a non-transitory computer-readable storage medium having embedded therein instructions, which when executed by the processor, cause the processor to perform a method for enabling communication between a first device operating over a first network and a second device operating over a second network, the instructions comprising:
   code to receive, at a communication server, a request over the first network from the first device requesting a communication session with the second device, the request including contact information associated with the first device and contact information associated with the second device;
   code to, in response to receiving the request, determine that the second device is not registered with the communication server;
   code to, in response to determining that a destination address of the second device is for a Public Switched Telephone Network (PSTN), coordinate with a communication gateway to conduct an Internet Protocol (IP) to PSTN communication session between the first device and the second device;
   code to enable, transmission of a notification over the second network to the second device, the notification notifying the second device of the request for the communication session, including enabling transmission of the notification to the second device via the PSTN;
   code to receive, at the communication server, an indication of acceptance of the communication session from the second device; and
   code to coordinate with the communication gateway to start, in response to receiving the indication of acceptance, the communication session between the first device and the second device over a combination of the first network and the second network.

* * * * *